United States Patent
Ye

(10) Patent No.: US 9,645,674 B2
(45) Date of Patent: May 9, 2017

(54) SELF-CAPACITIVE TOUCH SENSING DEVICES, TOUCH POINT POSITIONING METHOD, AND DISPLAY DEVICES

(71) Applicant: Shenzhen China Star Optoelectronics Technology Co., Ltd., Shenzhen, Guangdong (CN)

(72) Inventor: Chengliang Ye, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 137 days.

(21) Appl. No.: 14/425,040

(22) PCT Filed: Jan. 12, 2015

(86) PCT No.: PCT/CN2015/070543
§ 371 (c)(1),
(2) Date: Mar. 1, 2015

(87) PCT Pub. No.: WO2016/106832
PCT Pub. Date: Jul. 7, 2016

(65) Prior Publication Data
US 2016/0342273 A1  Nov. 24, 2016

(30) Foreign Application Priority Data
Dec. 31, 2014 (CN) .......................... 2014 1 0852984

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04104* (2013.01)

(58) Field of Classification Search
CPC ....... G06F 3/044; G06F 3/0412; G06F 3/0418
USPC .............................. 345/156–184; 1/1; 349/12
See application file for complete search history.

(56) References Cited

U.S. PATENT DOCUMENTS

| 8,728,327 B2* | 5/2014 | Hadfield | B01D 17/044 181/143 |
|---|---|---|---|
| 2009/0002336 A1* | 1/2009 | Choi | G06F 3/044 345/174 |
| 2011/0050617 A1* | 3/2011 | Murphy | G06F 3/0418 345/174 |
| 2011/0157068 A1* | 6/2011 | Parker | G06F 1/3203 345/174 |
| 2013/0082975 A1* | 4/2013 | Yeh | G06F 3/044 345/174 |
| 2013/0106755 A1* | 5/2013 | Hotelling | G06F 3/0412 345/173 |

(Continued)

*Primary Examiner* — Prabodh M Dharia
(74) *Attorney, Agent, or Firm* — Andrew C. Cheng

(57) ABSTRACT

A positioning method for positioning two touch points of self-capacitive touch sensing devices is disclosed. The method includes: applying a first driving signals to the N rows of row sensors in sequence to determine the row sensors having the touch points; applying a second driving signals to the M columns of column sensors to determine the column sensor having touch points; applying a third driving signals to the row sensors or the column sensors; detecting a delay time period of the third driving signals within the row sensors or the column sensor so as to determine coordinates of the real touch points in accordance with the delay time period. In addition, a self-capacitive touch sensing device adopting the above method and a display device incorporating the above touch sensing device are also disclosed.

12 Claims, 2 Drawing Sheets

(56) References Cited

U.S. PATENT DOCUMENTS

| | | | | |
|---|---|---|---|---|
| 2013/0300953 A1* | 11/2013 | Hotelling | G06F 3/0412 | 349/12 |
| 2013/0342506 A1* | 12/2013 | Westhues | G06F 3/044 | 345/174 |
| 2014/0009428 A1* | 1/2014 | Coulson | G06F 3/044 | 345/174 |
| 2014/0139480 A1* | 5/2014 | Seo | G06F 3/044 | 345/174 |
| 2014/0204058 A1* | 7/2014 | Huang | G06F 3/0418 | 345/174 |
| 2014/0285469 A1* | 9/2014 | Wright | G06F 3/044 | 345/174 |
| 2014/0362036 A1* | 12/2014 | Mo | G06F 3/044 | 345/174 |
| 2015/0002444 A1* | 1/2015 | Brunet | G06F 3/0416 | 345/174 |
| 2015/0035797 A1* | 2/2015 | Shahparnia | G06F 3/041 | 345/174 |
| 2015/0153845 A1* | 6/2015 | Chang | G06F 3/03545 | 345/179 |
| 2015/0177897 A1* | 6/2015 | Choi | G06F 3/044 | 345/174 |
| 2015/0242003 A1* | 8/2015 | Chang | G06F 3/03545 | 345/179 |
| 2016/0110023 A1* | 4/2016 | Araki | H03K 5/135 | 345/174 |
| 2016/0162110 A1* | 6/2016 | Kim | G06F 3/041 | 345/174 |
| 2016/0253001 A1* | 9/2016 | Sugita | G06F 3/044 | |

\* cited by examiner

SELF-CAPACITIVE TOUCH SENSING DEVICES, TOUCH POINT POSITIONING METHOD, AND DISPLAY DEVICES

BACKGROUND OF THE INVENTION

1. Field of the Invention

The present disclosure relates to self-capacitive touch panel technology, and more particularly to a self-capacitive touch sensing device, a positioning method of touch points, and a display device.

2. Discussion of the Related Art

With the development of mobile phones and tablets, touch panels are adopted to replace conventional keyboards. As such, the capacitive panels have been widely adopted. The capacitive panels are pretty sensitive and are capable of multi-touch, which contribute to the user experience, especially for the applications such as games and digital images.

Currently, projective capacitive panels may include self-capacitive and mutual-capacitive type. The self-capacitive panels adopt ITO to produce vertical and horizontal electrode arrays on a surface of the glass. The vertical and horizontal electrodes respectively form capacitance, namely, the self-capacitive. When fingers touch the capacitive panels, the capacitance of the fingers may be overlapped on the capacitance of the panels, which increases the capacitance of the panels. However, the self-capacitive panels may have ghost point issue.

FIG. 1 is a schematic view of one conventional self-capacitive touch sensing device ("device"). As shown, sensor pads are arranged in eight columns and eight rows, which totally sum up to 128 sensor pads. The device includes a glass substrate 1, column sensors (Y1-Y8), and row sensors (X1-X8). When points A and D are touched, row sensors (Y1-Y8), and column sensor (X1-X8). As shown, when two touch points (A, D) are touched, the row sensors (Y2, Y7) and the column sensors (X2, X7) respectively sense the two touch points. As the column sensors (Y1-Y8) and the row sensors (X1-X8) sense a column or a row at one time, in addition to touch points (A, D), also the touch points (B, C) are sensed. The coordinates of the four touch points are A (X2, Y2)-B (X7, Y2)-C (X2, Y7)-D (X7, Y7). Thus, in addition to touch points (A, D), it may be erroneously determined that the touch points (B, C) are touched. Under the circumstance, the touch points (B, C) are referred to as "ghost points." On the contrary, while the touch points (B, C) are touched, the corresponding ghost points are touch points (A, D).

Thus, it is needed to provide an easy method to solve the above-mentioned problem.

SUMMARY

According to the present disclosure, the positioning method is for positioning two touch points of self-capacitive touch sensing devices. The method not only can precisely determine the real touch points but also can avoid the ghost points.

In one aspect, a positioning method of touch points, the method is for positioning two touch points of self-capacitive touch sensing devices, the touch sensing device comprises N rows of row sensors and M columns of column sensors intersecting with the N rows of row sensors, comprising: applying a first driving signals to the N rows of row sensors in sequence to determine the row sensors $(Y_n, Y_{n+j})$ having the touch points; applying a second driving signals to the M columns of column sensors to determine the column sensor $(X_m, X_{m+i})$ having touch points; applying a third driving signals to one end of the row sensors $(Y_n, Y_{n+j})$ and detecting the third driving signals from the other end of the row sensors $(Y_n, Y_{n+j})$, comparing a delay time period of the third driving signals within the row sensors $(Y_n, Y_{n+j})$ to determine the corresponding column sensors $(X_m, X_{m+i})$ of the row sensor $(Y_n, Y_{n+j})$ having the touch points, and to determine two real touch points; or applying the third driving signals to one end of the column sensor $(X_m, X_{m+i})$ and detecting the third driving signals from the other end of the column sensor $(X_m, X_{m+i})$, comparing the delay time period of the third driving signals within the column sensor $(X_m, X_{m+i})$ to determine the corresponding row sensors $(Y_n, Y_{n+j})$ of the column sensor $(X_m, X_{m+i})$ having the touch points, and to determine two real touch points; and wherein M and N are integers larger than one, m, m+i∈[1,M], n, n+i∈[1,N].

In another aspect, a self-capacitive touch sensing device, comprising: N rows of row sensors and M columns of column sensors intersecting with the N rows of row sensors; a row control module, a column control module, and a determination module, wherein: the row control module is configured for applying a first driving signals to the N rows of row sensors in sequence to determine the row sensors $(Y_n, Y_{n+j})$ having the touch points; the column control module is configured for applying a second driving signals to the M columns of column sensors to determine the column sensor $(X_m, X_{m+i})$ having touch points; the row control module is configured for applying a third driving signals to one end of the row sensors $(Y_n, Y_{n+j})$ and for detecting the third driving signals from the other end of the row sensors $(Y_n, Y_{n+j})$; the determination module is configured for comparing a delay time period of the third driving signals within the row sensors $(Y_n, Y_{n+j})$ to determine the corresponding column sensors $(X_m, X_{m+i})$ of the row sensor $(Y_n, Y_{n+j})$ having the touch points, and to determine two real touch points; or the determination module is configured for applying the third driving signals to one end of the column sensor $(X_m, X_{m+i})$ and for detecting the third driving signals from the other end of the column sensor $(X_m, X_{m+i})$ comparing the delay time period of the third driving signals within the column sensor $(X_m, X_{m+i})$ to determine the corresponding row sensors $(Y_n, Y_{n+j})$ of the column sensor $(X_m, X_{m+i})$ having the touch points, and to determine two real touch points; and wherein M and N are integers larger than one, m, m+i∈[1,M], n, n+i∈[1,N].

In another aspect, a display device incorporating the above self-capacitive touch sensing device is disclosed.

In view of the above, the row sensor and the column sensor are driven in sequence to determine the candidate row sensors and column sensor having the touch points. At this moment, two real touch points and two ghost points are detected. Afterward, another driving signals is provided to the row sensors and the column sensor having the touch points to detect the RC delay of the driving signals when being transmitted via the row sensors or the column sensors. With respect to the same sensor, when the locations of the touch points are different, the touch points are considered as cutting points to divide the row sensors into two resistors with different resistance. The sum of the resistance is a fixed value. The RC delay becomes smaller when the touch point is closer to the input of the driving signals. As a result, the relative location of the column sensors or row sensors corresponding to the touch points may be determined so as to obtain the coordinates of the real touch points. The ghost points are effectively excluded.

DETAILED DESCRIPTION OF THE EMBODIMENTS

Figure 1:
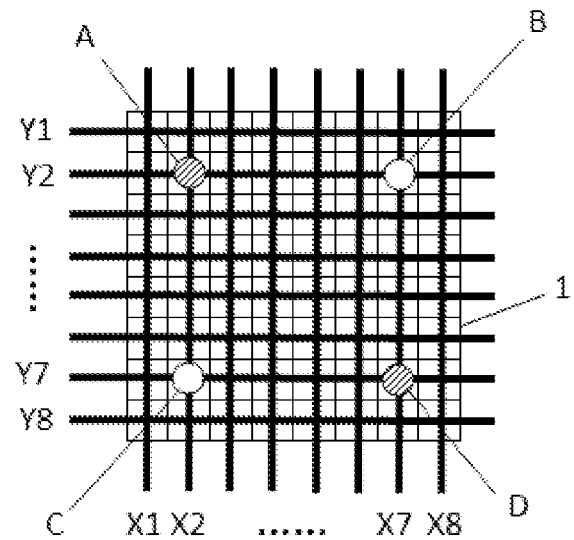
FIG. 1 is a schematic view of one conventional self-capacitive touch sensing device

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 2:
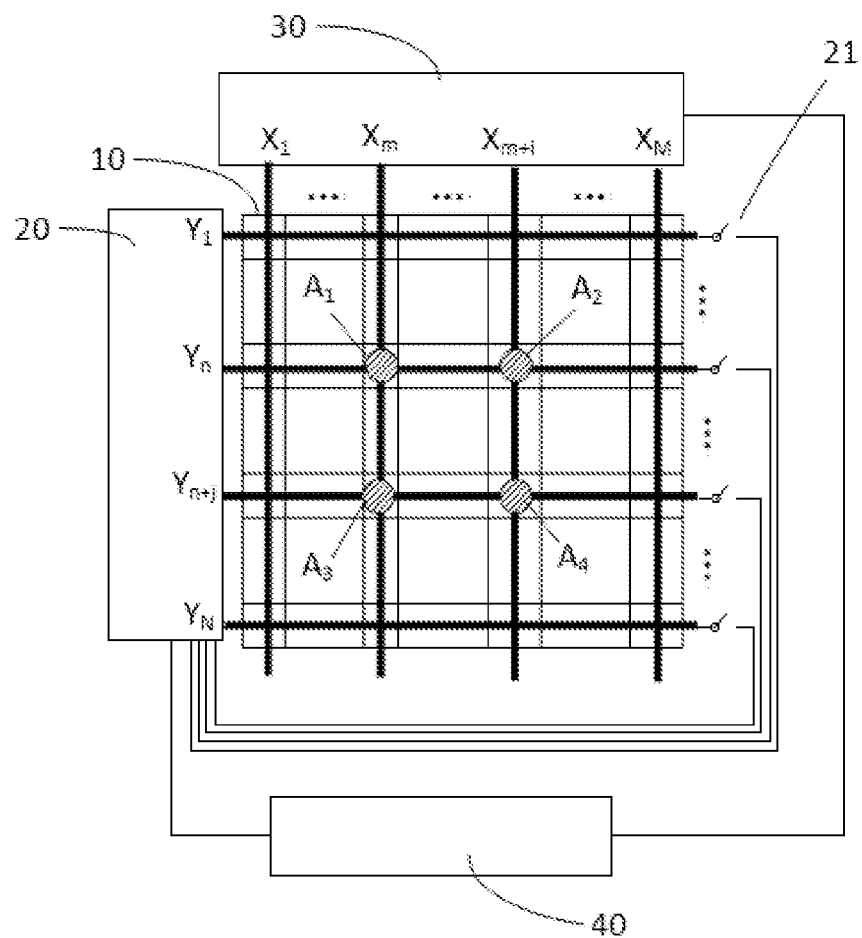
FIG. 2 is a schematic view showing the self-capacitive touch sensing device in accordance with the first embodiment.

FIG. 2 is a schematic view showing the self-capacitive touch sensing device in accordance with the first embodiment. As shown in FIG. 2, the self-capacitive touch sensing device includes a substrate 10, N rows of row sensors ($Y_1$-$Y_N$) and M columns of column sensors ($X_1$-$X_M$) intersecting with the N rows of row sensors. When the device is touch by two points, the row sensor ($Y_n$, $Y_{n+j}$) and the column sensor ($X_m$, $X_{m+i}$) respectively sense the two touch points, wherein M and N are integers larger than one, m, m+i∈[1,M], n, n+i∈[1,N].

The device further control a row control module 20, a column control module 30, and a determination module 40. The row control module 20 may apply the first driving signals to the N rows of row sensors ($Y_n$, $Y_{n+j}$) in sequence to determine the row sensors ($Y_n$, $Y_{n+j}$) having touch points. The column control module 30 may apply the second driving signals to the M columns of column sensors to determine the column sensors ($X_m$, $X_{m+i}$) having touch points. The determination module 40 respectively connects to the row control module 20 and the column control module 30 to obtain the scanning signals from the row control module 20 and the column control module 30, respectively. However, there are four intersecting points ($A_1$-$A_4$) of the row sensor ($Y_n$, $Y_{n+j}$) and the column sensor ($X_m$, $X_{m+i}$). The coordinates of the four intersecting points are respectively indicated by $A_1$ ($X_m$, $Y_n$), $A_2$ ($X_{m+i}$, $Y_n$), $A_3$ ($X_m$, $Y_{n+j}$) and $A_4$ ($X_{m+i}$, $Y_{n+j}$), which include two touch points and two ghost points.

In order to precisely determine the two touch points, in the embodiment, the row control module 20 further applies a third driving signals to one end of the row sensor ($Y_n$, $Y_{n+j}$) and detects the third driving signals from the other end. The determination module 40 may compare the delay time period (RC delay) of the third driving signals within the row sensors ($Y_n$, $Y_{n+j}$). The determination module 40 may determine the corresponding column sensors $X_m$ or $X_{m+i}$ of the row sensor ($Y_n$, $Y_{n+j}$) having the touch points. In the end, the two real touch points are determined. As shown in FIG. 2, the connecting line for detecting the third driving signals may connect to the column control module 20 via a switch component 21. When the row control module 20 applies the first driving signals to the row sensors, the switch component 21 is turned off and the self-capacitive is detected. When the row control module 20 applies the third driving signals to the row sensors, the switch component 21 is turned off and the delay time period of the third driving signals is detected.

Figure 3:
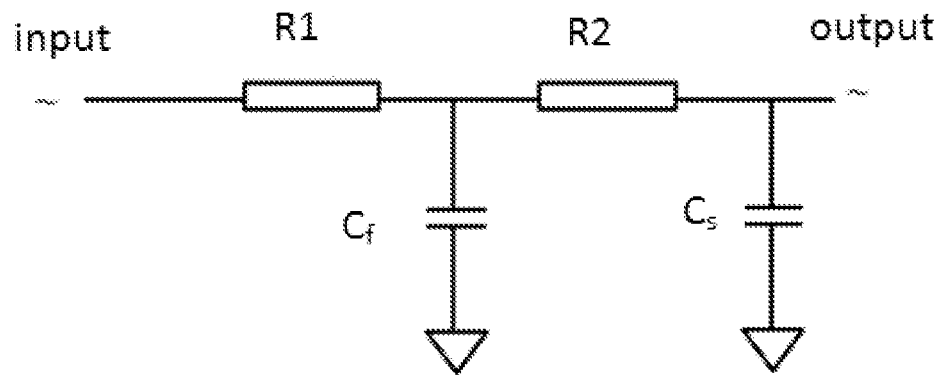
FIG. 3 is an equivalent circuit diagram of the row sensors applied with a third driving signals in accordance with the first embodiment.

As shown in the equivalent circuit diagram of FIG. 3, with respect to the sensors (Y) in the same row, when the locations of the touch points are different, the touch points are considered as cutting points to divide the row sensor (Y) into resistors R1 and R2 with different resistance. The sum of the resistance of R1 and R2 is a fixed value. When one end of the row sensor (Y) is applied with the third driving signals (input), the signals (output) detected in the other end of the row sensor (Y) has a delay time period (t), wherein t satisfies the equation below.

$$t = R1*C_f + (R1+R2)*C_s;$$

Wherein the sum of the resistance of the row sensor (Y) equals to the sum of the R1 and R2, which is a fixed value. $C_f$ is indicative of a touch capacitance of the finger (w), which is also the fixed value. $C_s$ is indicative of the capacitance of the row sensor (Y), which is the fixed value. Thus, in the above equation, the delay time period (t) may change in relation to the resistor (R1). The resistance (R1) becomes smaller when the touch point is closer to the input of the driving signals, which results in a smaller delay time period (t).

Referring to FIG. 2, the row control module 20 applies the third driving signals to the row sensors ($Y_n$, $Y_{n+j}$) closer to one end of the column sensor ($X_1$) and detects the third driving signals in the row sensors ($Y_n$, $Y_{n+j}$) closer to one end of the column sensor ($X_M$). The determination module 40 compares the delay time period of the third driving signals within the row sensors ($Y_n$, $Y_{n+j}$). If the delay time period of the third driving signals within the row sensor ($Y_n$) is smaller than the delay time period of the third driving signals within the row sensor ($Y_{n+j}$), it is determined that the touch point on the row sensor ($Y_n$) is closer to the input of the third driving signals than the touch point on the row sensor ($Y_{n+j}$). In addition, the column control module 30 is configured for determining the touch points of the column sensor ($X_m$, $X_{m+i}$). The column sensor ($X_m$, $X_{m+i}$) having the touch points, which are determined by the column control module 30, may determine the column sensor ($X_m$) corresponding to the row sensor ($Y_n$) of the touch points and may determine the column sensor ($X_{m+i}$) corresponding to the row sensor ($Y_{n+j}$) of the touch points. The coordinates of the two touch points are ($X_m$, $Y_n$) and A4 ($X_{m+i}$, $Y_{n+j}$).

On the contrary, if the delay time period of the third driving signals within the row sensor ($Y_n$) is larger than the delay time period of the third driving signals within the row sensor ($Y_{n+j}$), it is determined that the touch point on the row sensor ($Y_n$) is farther to the input of the third driving signals than the touch point on the row sensor ($Y_{n+j}$). Cooperating with the column sensors ($X_m$ and $X_{m+i}$) having the touch points, the The column sensor ($X_m$, $X_{m+i}$) having the touch points, which are determined by the column control module 30, may determine the column sensor ($X_{m+j}$) corresponding to the row sensor ($Y_n$) of the touch points, and may determine the column sensor ($X_m$) corresponding to the row sensor ($Y_{n+j}$) of the touch points. The coordinates of the two touch points are A2 ($X_{m+i}$, $Y_n$)和 A3 ($X_m$, $Y_{n+j}$).

In addition, the device is configured for being incorporated within display devices with touch functions.

Figure 4:
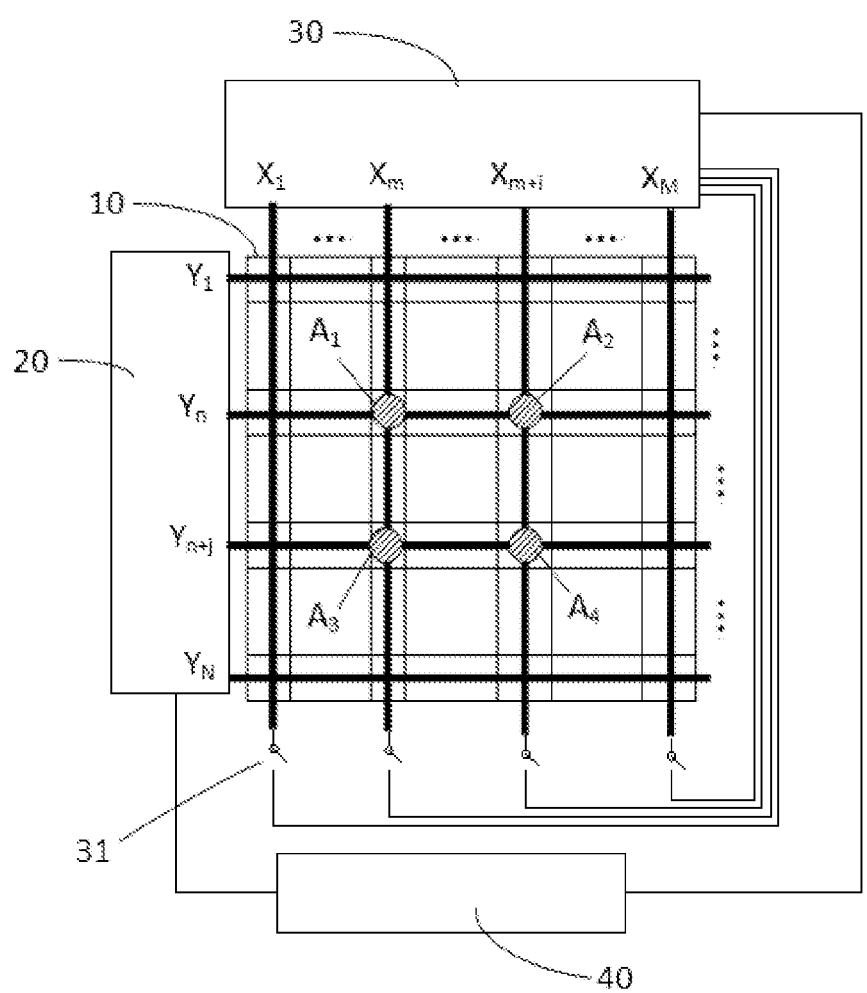
FIG. 4 is a schematic view of the self-capacitive touch sensing device in accordance with a second embodiment.

In the second embodiment as shown in FIG. 4, the difference between the first embodiment and the second embodiment resides in that the third driving signals is applied to one end of the column sensors ($X_m$ and $X_{m+i}$) from the column control module 30, and the third driving signals is detected in the other end of the column sensors ($X_m$ and $X_{m+i}$). The determination module 40 compares the delay time period within the column sensors ($X_n$, $X_{m+i}$). The row sensors ($Y_n$, $Y_{n+j}$) are configured to determine the touch points on the column sensors ($X_m$, $X_{m+i}$) and then determine the real two touch points. As shown in FIG. 4, a connecting line for detecting the third driving signals may connect to the column control module 30 via a switch component 31. When the column control module 30 applies the second driving signals to the column sensors, the switch component 31 is turned off and the self-capacitive is detected. When the column control module 30 applies the third driving signals to the column sensors, the switch component 31 is turned off and the delay time period of the third driving signals is detected, which may be referenced to the first embodiment.

Specifically, as shown in FIG. 4, the column control module 30 applies the third driving signals to the column sensors ($X_m$, $X_{m+i}$) close to one end of the row sensor ($Y_1$), and detects the third driving signals of the column sensors ($X_m$, $X_{m+i}$) close to one end of the row sensors ($Y_N$). The determination module 40 compares the delay time period of the third driving signals within the column sensors ($X_m$, $X_{m+i}$). If the delay time period of the third driving signals within the row sensor ($X_m$) is smaller than the delay time period of the third driving signals within the row sensor ($X_{m+i}$), it is determined that the touch point on the column sensor ($X_m$) is closer to the input of the third driving signals than the touch point on the column sensor ($X_{m+i}$). The row sensor ($Y_n$, $Y_{n+j}$) having the touch points, which are determined by the row control module 20, may determine the row sensor ($Y_n$) corresponding to the column sensor ($X_m$) of the touch points and may determine the row sensor ($Y_{n+j}$) corresponding to the column sensor ($X_{m+i}$) of the touch points. The coordinates of the two touch points are A1 ($X_m$, $Y_n$) and A4 ($X_{m+i}$, $Y_{n+j}$).

On the contrary, if the delay time period of the third driving signals within the column sensor ($X_m$) is larger than the delay time period of the third driving signals within the column sensor ($X_{m+i}$), it is determined that the touch point on the column sensor ($X_m$) is farther to the input of the third driving signals than the touch point on the column sensor ($X_{m+i}$) Cooperating with the column sensors ($X_m$ and $X_{m+i}$) having the touch points, it is determined that the row sensor ($Y_{n+j}$) corresponds to the column sensor ($X_m$) corresponding to the touch points, and it is determined that the row sensor ($Y_n$) corresponds to the column sensor ($X_{m+i}$) corresponding to the touch points. The coordinates of the two touch points are A2 ($X_{m+i}$, $Y_n$) and A3 ($X_m$, $Y_{n+j}$).

In the embodiment, when the row sensor of the device applies the driving signals and detects the sensed values of the row sensors. If the sensed value being detected is larger than a predetermined value, it is determined that the corresponding row sensor has detected the touch point. The column sensor of the device applies the driving signals and detects the sensed values of the column sensors. If the sensed value being detected is larger than a predetermined value, it is determined that the corresponding column sensor has detected the touch point. Specifically, the sensed value is the capacitance of the sensor.

In addition, the device is configured for being incorporated within display devices with touch functions.

In view of the above, the row sensor and the column sensor are driven in sequence to determine the candidate row sensors and column sensor having the touch points. At this moment, two real touch points and two ghost points are detected. Afterward, another driving signals is provided to the row sensors and the column sensor having the touch points to detect the RC delay of the driving signals when being transmitted via the row sensors or the column sensors. With respect to the same sensor, when the locations of the touch points are different, the touch points are considered as cutting points to divide the row sensor into two resistors with different resistance. The sum of the resistance is a fixed value. The RC delay becomes smaller when the touch point is closer to the input of the driving signals. As a result, the relative location of the column sensors or row sensors corresponding to the touch points may be determined so as to obtain the coordinates of the real touch points. The ghost points are effectively excluded.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A positioning method of touch points, the method is for positioning two touch points of self-capacitive touch sensing devices, the touch sensing device comprises N rows of row sensors and M columns of column sensors intersecting with the N rows of row sensors, comprising:

applying first driving signals to the N rows of row sensors in sequence by a row control module to determine the row sensors ($Y_n$, $Y_{n+j}$) having the touch points;

applying second driving signals to the M columns of column sensors by a column control module to determine the column sensor ($X_m$, $X_{m+i}$) having touch points;

applying third driving signals to one end of the row sensors ($Y_n$, $Y_{n+j}$) and detecting the third driving signals from the other end of the row sensors ($Y_n$, $Y_{n+j}$) by the row control module, comparing a delay time period of the third driving signals within the row sensors ($Y_n$, $Y_{n+j}$) by a determination module to determine the corresponding column sensors ($X_m$, $X_{m+i}$) of the row sensor ($Y_n$, $Y_{n+j}$) having the touch points, and to determine two real touch points; or applying the third driving signals to one end of the column sensor ($X_m$, $X_{m+i}$) and detecting the third driving signals from the other end of the column sensor ($X_m$, $X_{m+i}$) by the row control module, comparing the delay time period of the third driving signals within the column sensor ($X_m$, $X_{m+i}$) by the determination module to determine the corresponding row sensors ($Y_n$, $Y_{n+j}$) of the column sensor ($X_m$, $X_{m+i}$) having the touch points, and to determine two real touch points;

wherein M and N are integers larger than one, and m and m+I $\epsilon$[1,M], and n and n+i$\epsilon$[1,N]; and applying the third driving signals to the row sensor ($Y_n$, $Y_{n+j}$) closer to one end of the column sensor ($X_1$);

detecting the third driving signals in the row sensor ($Y_n$, $Y_{n+j}$) closer to one end of the column sensor ($X_m$);

if the delay time period of the third driving signals within the row sensor ($Y_n$) is smaller than the delay time period of the third driving signals within the row sensor ($Y_{n+j}$), it is determined that the column sensor ($X_m$) corresponds to the row sensor ($Y_n$) having the touch point, and coordinates of the two real touch points are ($X_m$, $Y_n$) and ($X_{m+i}$, $Y_{n+j}$); and if the delay time period of the third driving signals within the row sensor ($Y_n$) is larger than the delay time period of the third driving signals within the row sensor ($Y_{n+j}$), it is determined that the column sensor ($X_{m+i}$) corresponds to the row sensor ($Y_n$) having the touch point and the column sensor ($X_m$) corresponds to the row sensor ($Y_{n+j}$) having the touch point, and coordinates of the two real touch points are ($X_m$, $Y_n$) and ($X_{m+i}$, $Y_{n+j}$).

2. The positioning method as claimed in claim 1, the method further comprises:

applying the third driving signals to the column sensor ($X_m$, $X_{m+i}$) closer to one end of the column sensor ($Y_1$);

detecting the third driving signals in the column sensor ($X_m$, $X_{m+i}$) closer to one end of the column sensor ($Y_n$);

if the delay time period of the third driving signals within the column sensor ($X_m$) is smaller than the delay time period of the third driving signals within the column sensor ($X_{m+i}$), it is determined that the row sensor ($Y_n$) corresponds to the column sensor ($X_m$) having the touch point, and coordinates of the two real touch points are ($X_m$, $Y_n$) and ($X_{m+i}$, $Y_{n+j}$); and if the delay time period of the third driving signals within the column sensor ($X_m$) is larger than the delay time period of the third driving signals within the column sensor ($X_{m+i}$), it is determined that the row sensor ($Y_{n+j}$) corresponds to the column sensor ($X_m$) having the touch point and the row sensor ($Y_n$) corresponds to the column sensor ($X_{m+i}$) having the touch point, and coordinates of the two real touch points are ($X_{m+i}$, $Y_n$) and ($X_m$, $Y_{n+j}$).

3. The positioning method as claimed in claim 1, wherein:

detecting sensed values of the row sensor or the column sensor when the touch sensing device has applied driving signals to the row sensor or the column sensor; and determining that the corresponding column sensor or row sensor has detected the touch point when the sensed value is larger than a predetermined value.

4. The positioning method as claimed in claim 3, wherein the sensed value is a capacitance of the sensor.

5. A self-capacitive touch sensing device, comprising:

N rows of row sensors and M columns of column sensors intersecting with the N rows of row sensors;

a row control module, a column control module, and a determination module, wherein:

the row control module is configured for applying first driving signals to the N rows of row sensors in sequence to determine the row sensors ($Y_n$, $Y_{n+j}$) having the touch points;

the column control module is configured for applying second driving signals to the M columns of column sensors to determine the column sensor ($X_m$, $X_{m+i}$) having touch points;

the row control module is configured for applying third driving signals to one end of the row sensors ($Y_n$, $Y_{n+j}$) and for detecting the third driving signals from the other end of the row sensors ($Y_n$, $Y_{n+j}$);

the determination module is configured for comparing a delay time period of the third driving signals within the row sensors ($Y_n$, $Y_{n+j}$) to determine the corresponding column sensors ($X_m$, $X_{m+i}$) of the row sensor ($Y_n$, $Y_{n+j}$) having the touch points, and to determine two real touch points; or the determination module is configured for applying the third driving signals to one end of the column sensor ($X_m$, $X_{m+i}$) and for detecting the third driving signals from the other end of the column sensor ($X_m$, $X_{m+i}$), comparing the delay time period of the third driving signals within the column sensor ($X_m$, $X_{m+i}$) to determine the corresponding row sensors ($Y_n$, $Y_{n+j}$) of the column sensor ($X_m$, $X_{m+i}$) having the touch points, and to determine two real touch points; and wherein M and N are integers larger than one, and m and m+I $\epsilon$[1,M], and n and n+i$\epsilon$[1,N]; and the row control module is configured for applying the third driving signals to the row sensor ($Y_n$, $Y_{n+j}$) closer to one end of the column sensor ($X_1$) and for detecting the third driving signals in the row sensor ($Y_n$, $Y_{n+j}$) closer to one end of the column sensor ($X_m$);

the determination module is configured for comparing a delay time period of the third driving signals within the row sensors ($Y_n$, $Y_{n+j}$);

if the delay time period of the third driving signals within the row sensor ($Y_n$) is smaller than the delay time period of the third driving signals within the row sensor ($Y_{n+j}$), it is determined that the column sensor ($X_m$) corresponds to the row sensor ($Y_n$) having the touch point, and coordinates of the two real touch points are ($X_m$, $Y_n$) and ($X_{m+i}$, $Y_{n+j}$); and if the delay time period of the third driving signals within the row sensor ($Y_n$) is larger than the delay time period of the third driving signals within the row sensor ($Y_{n+j}$), it is determined that the column sensor ($X_{m+i}$) corresponds to the row sensor ($Y_n$) having the touch point and the column sensor ($X_m$) corresponds to the row sensor ($Y_{n+j}$) having the touch point, and coordinates of the two real touch points are ($X_m$, $Y_n$) and ($X_{m+i}$, $Y_{n+j}$).

6. The device as claimed in claim 5, wherein:

the column control module is configured for applying the third driving signals to the column sensor ($X_m$, $X_{m+i}$) closer to one end of the column sensor ($Y_1$), and for detecting the third driving signals in the column sensor ($X_m$, $X_{m+i}$) closer to one end of the column sensor ($Y_n$);

if the delay time period of the third driving signals within the column sensor ($X_m$) is smaller than the delay time period of the third driving signals within the column sensor ($X_{m+i}$), it is determined that the row sensor ($Y_n$) corresponds to the column sensor ($X_m$) having the touch point, and coordinates of the two real touch points are ($X_m$, $Y_n$) and ($X_{m+i}$, $Y_{n+j}$); and if the delay time period of the third driving signals within the column sensor ($X_m$) is larger than the delay time period of the third driving signals within the column sensor ($X_{m+i}$), it is determined that the row sensor ($Y_{n+j}$) corresponds to the column sensor ($X_m$) having the touch point and the row sensor ($Y_n$) corresponds to the column sensor ($X_{m+i}$) having the touch point, and coordinates of the two real touch points are ($X_{m+i}$, $Y_n$) and ($X_m$, $Y_{n+j}$).

7. The device as claimed in claim 5, wherein:
when the row sensor has applied driving signals, sensed values of the row sensor are detected;
it is determined that the touch point has been detected by corresponding row sensor when the sensed value is larger than a predetermined value;
when the column sensor has applied driving signals, the sensed values of the column sensor are detected; and
it is determined that the touch point has been detected by corresponding column sensor when the sensed value is larger than the predetermined value.

8. The device as claimed in claim 7, wherein the sensed value is a capacitance of the sensor.

9. A display device having a self-capacitive touch sensing device, the touch sensing device comprising:
N rows of row sensors and M columns of column sensors intersecting with the N rows of row sensors;
a row control module, a column control module, and a determination module, wherein:
the row control module is configured for applying first driving signals to the N rows of row sensors in sequence to determine the row sensors ($Y_n$, $Y_{n+j}$) having the touch points;
the column control module is configured for applying second driving signals to the M columns of column sensors to determine the column sensor ($X_m$, $X_{m+i}$) having touch points;
the row control module is configured for applying third driving signals to one end of the row sensors ($Y_n$, $Y_{n+j}$) and for detecting the third driving signals from the other end of the row sensors ($Y_n$, $Y_{n+j}$);
the determination module is configured for comparing a delay time period of the third driving signals within the row sensors ($Y_n$, $Y_{n+j}$) to determine the corresponding column sensors ($X_m$, $X_{m+i}$) of the row sensor ($Y_n$, $Y_{n+j}$) having the touch points, and to determine two real touch points; or
the determination module is configured for applying the third driving signals to one end of the column sensor ($X_m$, $X_{m+i}$) and for detecting the third driving signals from the other end of the column sensor ($X_m$, $X_{m+i}$), comparing the delay time period of the third driving signals within the column sensor ($X_m$, $X_{m+i}$) to determine the corresponding row sensors ($Y_n$, $Y_{n+j}$) of the column sensor ($X_m$, $X_{m+i}$) having the touch points, and to determine two real touch points;
wherein M and N are integers larger than one, and m and m+i∈[1,M], and n and n+i∈[1,N]; and
the row control module is configured for applying the third driving signals to the row sensor ($Y_n$, $Y_{n+j}$) closer to one end of the column sensor ($X_1$) and for detecting the third driving signals in the row sensor ($Y_n$, $Y_{n+j}$) closer to one end of the column sensor ($X_m$);
the determination module is configured for comparing a delay time period of the third driving signals within the row sensors ($Y_n$, $Y_{n+j}$);
if the delay time period of the third driving signals within the row sensor ($Y_n$) is smaller than the delay time period of the third driving signals within the row sensor ($Y_{n+j}$), it is determined that the column sensor ($X_m$) corresponds to the row sensor ($Y_n$) having the touch point, and coordinates of the two real touch points are ($X_m$, $Y_n$) and ($X_{m+i}$, $Y_{n+j}$); and
if the delay time period of the third driving signals within the row sensor ($Y_n$) is larger than the delay time period of the third driving signals within the row sensor ($Y_{n+j}$), it is determined that the column sensor ($X_{m+i}$) corresponds to the row sensor ($Y_n$) having the touch point and the column sensor ($X_m$) corresponds to the row sensor ($Y_{n+j}$) having the touch point, and coordinates of the two real touch points are ($X_m$, $Y_n$) and ($X_{m+i}$, $Y_{n+j}$).

10. The device as claimed in claim 9, wherein:
the column control module is configured for applying the third driving signals to the column sensor ($X_m$, $X_{m+i}$) closer to one end of the column sensor ($Y_1$), and for detecting the third driving signals in the column sensor ($X_m$, $X_{m+i}$) closer to one end of the column sensor ($Y_n$);
if the delay time period of the third driving signals within the column sensor ($X_m$) is smaller than the delay time period of the third driving signals within the column sensor ($X_{m+i}$), it is determined that the row sensor ($Y_n$) corresponds to the column sensor ($X_m$) having the touch point, and coordinates of the two real touch points are ($X_m$, $Y_n$) and ($X_{m+i}$, $Y_{n+j}$); and
if the delay time period of the third driving signals within the column sensor ($X_m$) is larger than the delay time period of the third driving signals within the column sensor ($X_{m+i}$), it is determined that the row sensor ($Y_{n+j}$) corresponds to the column sensor ($X_m$) having the touch point and the row sensor ($Y_n$) corresponds to the column sensor ($X_{m+i}$) having the touch point, and coordinates of the two real touch points are ($X_{m+i}$, $Y_n$) and ($X_m$, $Y_{n+j}$).

11. The device as claimed in claim 9, wherein:
when the row sensor has applied driving signals, sensed values of the row sensor are detected;
it is determined that the touch point has been detected by corresponding row sensor when the sensed value is larger than a predetermined value;
when the column sensor has applied driving signals, the sensed values of the column sensor are detected; and
it is determined that the touch point has been detected by corresponding column sensor when the sensed value is larger than the predetermined value.

12. The device as claimed in claim 11, wherein the sensed value is a capacitance of the sensor.

* * * * *